US008749573B2

(12) United States Patent
Ali et al.

(10) Patent No.: US 8,749,573 B2
(45) Date of Patent: Jun. 10, 2014

(54) METHOD AND APPARATUS FOR PROVIDING INPUT THROUGH AN APPARATUS CONFIGURED TO PROVIDE FOR DISPLAY OF AN IMAGE

(75) Inventors: Syed Reza Ali, Los Angeles, CA (US); Sean Michael White, Los Angeles, CA (US)

(73) Assignee: Nokia Corporation, Espoo (FI)

( * ) Notice: Subject to any disclaimer, the term of this patent is extended or adjusted under 35 U.S.C. 154(b) by 441 days.

(21) Appl. No.: 13/116,648

(22) Filed: May 26, 2011

(65) Prior Publication Data

US 2012/0299950 A1   Nov. 29, 2012

(51) Int. Cl.
G09G 5/02 (2006.01)
(52) U.S. Cl.
USPC .......................................... 345/592; 382/236
(58) Field of Classification Search
CPC ...................... G06F 3/0346; G06F 2200/1636
USPC .......................................... 345/592; 382/236
See application file for complete search history.

(56) References Cited

U.S. PATENT DOCUMENTS

| 5,682,210 A | 10/1997 | Weirich |
| 6,369,794 B1 | 4/2002 | Sakurai et al. |
| 6,771,294 B1 | 8/2004 | Pulli et al. |
| 2002/0044152 A1 | 4/2002 | Abbott et al. |
| 2002/0122014 A1 | 9/2002 | Rajasingham |
| 2002/0167699 A1 | 11/2002 | Verplaetse et al. |
| 2004/0169674 A1 | 9/2004 | Linjama |
| 2005/0012723 A1 | 1/2005 | Pallakoff |
| 2005/0246109 A1 | 11/2005 | Bang et al. |
| 2006/0211499 A1 | 9/2006 | Bengtsson et al. |
| 2007/0220443 A1 | 9/2007 | Cranfill et al. |
| 2007/0247434 A1 | 10/2007 | Cradick et al. |
| 2008/0129839 A1 | 6/2008 | Asukai et al. |
| 2009/0051879 A1 | 2/2009 | Vitale et al. |
| 2010/0164990 A1 | 7/2010 | Van Doorn |
| 2011/0231757 A1* | 9/2011 | Haddick et al. ............... 715/702 |

FOREIGN PATENT DOCUMENTS

WO   WO 2011/044680 A1   4/2011

OTHER PUBLICATIONS

Awesome Augmented reality Glasses "Stark HUD 2020" from Fujikawa—YouTube [online] [retrieved Sep. 26, 2011]. Retrieved from the Internet: <URL: http://www.youtube.com/watch?v=1_u34kV9go0&feature=related>, 2 pages.

(Continued)

*Primary Examiner* — Maurice L McDowell, Jr.
(74) *Attorney, Agent, or Firm* — Alston & Bird LLP

(57) ABSTRACT

Provided herein is a technique by which a user may interact with an apparatus configured to provide for display of an image, such as with augmented reality glasses. An example embodiment may provide a method including receiving an indication of a first motion event initiated on a first side of a device from a motion sensor, determining a first motion event pattern based on one or more directional components of the first motion event, distinguishing the first motion event from a motion event initiated on a second side of the device, correlating a first operation with the first motion event pattern, and causing the first operation to be performed. The first operation may include causing the opacity of an image presented on a substantially transparent display to be increased.

20 Claims, 5 Drawing Sheets

(56) References Cited

OTHER PUBLICATIONS

Nokia Remixes Reality with AR glasses [online] [retrieved Sep. 26, 2011]. Retrieved from the Internet: <URL: http://dsinsights.blogspot.com/2009/09/nokio-remixes-reality-with-ar-glasses.html>. 9 pages.

BMW Augmented Reality Glasses Help Average Joes Make Repairs | Popular Science [online] [retrieved Sep. 26, 2011]. Retrieved from the Internet: <URL: http://www.popsci.com/scitech/article/2009-09/bmw-developing-augmented-realty-help . . . > 3 pages.

Office Action for U.S. Appl. No. 11/430,263 dated Jul. 19, 2012.

International Search Report and Written Opinion for International Patent Application No. PCT/IB2007/000827, mailed Sep. 13, 2007.

International Search Report and Written Opinion from International Patent Application No. PCT/FI2012/050441 mailed Aug. 17, 2012.

* cited by examiner

METHOD AND APPARATUS FOR PROVIDING INPUT THROUGH AN APPARATUS CONFIGURED TO PROVIDE FOR DISPLAY OF AN IMAGE

TECHNOLOGICAL FIELD

Some example embodiments of the present invention relate generally to user interface technology such as apparatuses configured to provide for display of an image and, more particularly, to input techniques for interaction with augmented reality glasses.

BACKGROUND

The modern communications era has brought about a tremendous expansion of wireline and wireless networks. Computer networks, television networks, and telephony networks are experiencing an unprecedented technological expansion fueled by consumer demands. Together with these expanding network capabilities and communication speeds, the devices that use these networks have experienced tremendous technological steps forward in capabilities, features, and user interface. Such devices may also use accessories such as remote input devices, Bluetooth™ headsets or wired headsets with limited functional capabilities. Other accessories may include remote display devices such as augmented reality glasses; however augmented reality glasses, or other accessory devices disclosed herein may include the functionality of a mobile terminal thereby not requiring a controlling device. Devices communicating via these networks may be used for a wide variety of purposes including, among other things, Short Messaging Services (SMS), Instant Messaging (IM) service, E-mail, voice calls, music recording/playback, video recording/playback, and internet browsing. Such capabilities have made these devices very desirable for those wishing to stay in touch and make themselves available to others.

Hands free devices have increased in popularity through the advent of laws prohibiting hand-held mobile device usage when driving a vehicle and the desire of users to communicate without monopolizing the use of a hand. Such devices may include a wired headset that is physically connected to a mobile device or a Bluetooth™ headset that is connected to a mobile device through a wireless Personal Area Network connection. Additionally, wired or wireless remote display devices, such as projectors, monitors, or augmented reality glasses may provide an alternative display option to a display that is attached to the device. Such displays may enable a user to display content to a group of people, such as with a projector, or the displays may provide a non-intrusive method for a user to view content, such as with augmented reality glasses. Further, a remote display may allow a user to view content while the controlling device remains concealed in a pocket, purse, briefcase, or the like. Optionally, devices such as augmented reality glasses may incorporate all of the functionality of a mobile terminal. Such displays may provide a user a more convenient technique of viewing content; however, interaction with the device or the content on the display may still require physical manipulation of the device.

BRIEF SUMMARY

A method, apparatus and computer program product are provided to enable the provision of a mechanism by which a user may interact with a device capable of providing for display of an image, such as augmented reality glasses.

An example embodiment may provide a method including receiving an indication of a first motion event initiated on a first side of a device from a motion sensor, determining a first motion event pattern based on one or more directional components of the first motion event, distinguishing the first motion event from a motion event initiated on a second side of the device, correlating a first operation with the first motion event pattern, and causing the first operation to be performed. The first operation may include causing the opacity of an image presented on a substantially transparent display to be increased. The method of one embodiment may also include receiving an indication of a second motion event at the motion sensor, determining a second motion event pattern based on one or more directional components of the second motion event, where the second motion event pattern is different than the first motion event pattern, correlating a second operation with the second motion event pattern, where the second operation is different than the first operation, and causing the second operation to be performed. The first operation may relate to an occlusive effect of an image on a display. The method of another embodiment may also include causing a request to be sent to the motion sensor. Correlating the first operation with the first motion event pattern may include correlating the first motion event pattern with an operation obtained from a map of operations that associates operations with motion event patterns. The first motion event may include a plurality of motion events. Correlating the first operation with the first motion event pattern may include correlating the first motion event pattern with an operational state of a device.

Another example embodiment may provide an apparatus including at least one processor and at least one memory including computer program code, the at least one memory and the computer program code configured to, with the processor, cause the apparatus to at least receive an indication of a first motion event initiated on a first side of a device from a motion sensor, determine a first motion event pattern based on one or more directional components of the first motion event, distinguish the first motion event from a motion event initiated on a second side of the device, correlate a first operation with the first motion event pattern, and cause the first operation to be performed. The first operation may include causing the opacity of an image presented on a substantially transparent display to be increased.

The apparatus of one embodiment may further be configured to receive an indication of a second motion event at the motion sensor, determine a second motion event pattern based on one or more directional components of the second motion event, where the second motion event pattern is different than the first motion event pattern, correlate a second operation with the second motion event pattern, where the second operation is different than the first operation, and cause the second operation to be performed. The first operation relates to an occlusive effect of an image on a display. The apparatus of another embodiment may further be configured to send a request to the motion sensor. The apparatus may be configured to correlate the first operation with the first motion event pattern by causing the apparatus to correlate the first motion event pattern with an operation obtained from a map of operations that associates operations with motion event patterns. The first motion event may include a plurality of motion events. The apparatus may be configured to correlate the first operation with the first motion event pattern by causing the apparatus to correlate the first motion event pattern with an operational state of the apparatus.

Another example embodiment may provide a computer program product comprising at least one non-transitory computer-readable storage medium having computer-executable program code instructions stored therein, the computer-executable program code instructions comprising program code instructions to receive an indication of a first motion event initiated on a first side of a device from a motion sensor, determine a first motion event pattern based on one or more directional components of the first motion event, distinguish the first motion event from a motion event initiated on a second side of the device, correlate the first operation with the first motion event pattern, and cause the first operation to be performed. The first operation may include causing the opacity of an image presented on a substantially transparent display to be increased.

The computer program product of one embodiment may further include program code instructions to receive an indication of a second motion event at the motion sensor, determine a second motion event pattern based on one or more directional components of the second motion event, where the second motion event pattern is different than the first motion event pattern, correlate a second operation with the second motion event pattern, where the second operation is different than the first operation, and cause the second operation to be performed. The first operation may relate to an occlusive effect of an image on a display. The program code instructions to may include program code instructions to cause a request to be sent to a motion sensor. The program code instructions to correlate the first operation with the first motion event pattern may include program code instructions to correlate the first motion event pattern with an operation obtained from a map of operations that associates operations with motion event patterns. The first motion event pattern may include a plurality of motion events.

Another example embodiment may provide an apparatus including means for receiving an indication of a first motion event initiated on a first side of a device from a motion sensor, means for determining a first motion event pattern based on one or more directional components of the first motion event, means for distinguishing the first motion event from a motion event initiated on a second side of the device, means for correlating a first operation with the first motion event pattern, and means for causing the first operation to be performed. The first operation may include causing the opacity of an image presented on a substantially transparent display to be increased. The apparatus may further be configured with means for receiving an indication of a second motion event at the motion sensor, means for determining a second motion event pattern based on one or more directional components of the second motion event, where the second motion event pattern is different than the first motion event pattern, means for correlating a second operation with the second motion event pattern, where the second operation is different than the first operation, and means for causing the second operation to be performed. The first operation may relate to an occlusive effect of an image on a display. The apparatus may further include means for causing a request to be sent to the motion sensor. The means for causing the apparatus to correlate the first operation with the first motion event pattern may include means for causing the apparatus to correlate the first motion event pattern with a first operation obtained from a map of operations that associates operations with motion event patterns. The first motion event may include a plurality of motion events. The means for causing the apparatus to correlate the first operation with the first motion event pattern may include means for causing the apparatus to correlate the first motion event pattern with an operational state of the apparatus.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
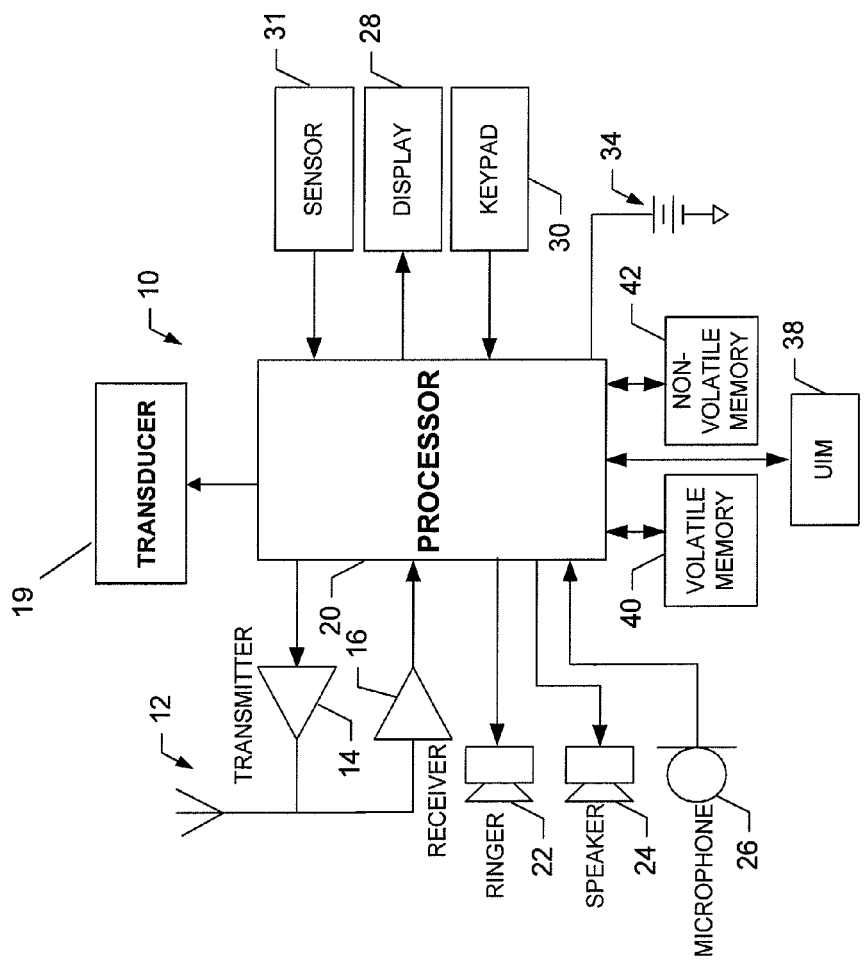
FIG. 1 is a schematic block diagram of a mobile terminal according to an example embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with some embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Some embodiments of the present invention may relate to a provision of a mechanism for a user to interface with an apparatus, such as augmented reality glasses, configured to provide for display of an image, such as an image indicating a graphical user interface. The physical manipulation or motion of the apparatus may be interpreted by the device to be an input. Motion such as tapping or otherwise moving the apparatus may be interpreted as a user input and cause a correlated operation to occur as will be described further below.

FIG. 1 illustrates a block diagram of a mobile terminal 10 that would benefit from embodiments of the present invention. It should be understood, however, that the mobile terminal 10 as illustrated and hereinafter described is merely illustrative of one type of device that may benefit from embodiments of the present invention and, therefore, should not be taken to limit the scope of embodiments of the present invention. As such, although numerous types of mobile terminals, such as portable digital assistants (PDAs), mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, and other types of voice and text communications systems, may readily employ embodiments of the present invention, other devices including fixed (non-mobile) electronic devices may also employ some example embodiments.

The mobile terminal 10 may include an antenna 12 (or multiple antennas) in operable communication with a transmitter 14 and a receiver 16. The mobile terminal 10 may further include an apparatus, such as a processor 20 or other processing device (e.g., processor 70 of FIG. 2), which controls the provision of signals to and the receipt of signals from the transmitter 14 and receiver 16, respectively. The signals may include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

In some embodiments, the processor 20 may include circuitry desirable for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 may additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (display 28 providing an example of such a touch display) or other input device. In embodiments including the keypad 30, the keypad 30 may include the conventional numeric (0-9) and related keys (#, *), and other hard and soft keys used for operating the mobile terminal 10. Alternatively or additionally, the keypad 30 may include a conventional QWERTY keypad arrangement. The keypad 30 may also include various soft keys with associated functions. In addition, or alternatively, the mobile terminal 10 may include an interface device such as a joystick or other user input interface. Some embodiments employing a touch display may omit the keypad 30 and any or all of the speaker 24, ringer 22, and microphone 26 entirely. Embodiments of the mobile terminal may further include a transducer 19, for example, as part of the user interface. The transducer 19 may be a haptic transducer for providing haptic feedback to a user. The haptic feedback may be provided in response to inputs received by the user or by the mobile terminal for providing tactile notification to a user.

Additional input to the processor 20 may include a sensor 31, which may be a component of the mobile terminal 10 or remote from the mobile terminal, but in communication therewith. The sensor 31 may include one or more of a motion sensor, temperature sensor, light sensor, accelerometer, or the like. Forms of input that may be received by the sensor may include physical motion of the mobile terminal 10, light impinging upon the mobile terminal, such as whether or not the mobile terminal 10 is in a dark environment (e.g., a pocket) or in daylight, and/or whether the mobile terminal is being held by a user or not (e.g., through temperature sensing of a hand). The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which may be embedded and/or may be removable. The memories may store any of a number of pieces of information, and data, used by the mobile terminal 10 to implement the functions of the mobile terminal 10.

In some embodiments, the mobile terminal 10 may also include a camera or other media capturing element (not shown) in order to capture images or video of objects, people and places proximate to the user of the mobile terminal 10. However, the mobile terminal 10 (or even some other fixed terminal) may also practice example embodiments in connection with images or video content (among other types of content) that are produced or generated elsewhere, but are available for consumption at the mobile terminal 10 (or fixed terminal).

An example embodiment of the invention will now be described with reference to FIG. 2, in which certain elements of an apparatus 50 for providing a mechanism by which relevant content may be determined and/or presented or displayed. The apparatus 50 of FIG. 2 may be employed, for example, in conjunction with the mobile terminal 10 of FIG. 1. The user interface 72 of FIG. 2 may include one or more of the sensor 84 and/or a tactile input 80, such as a button or key. The sensor 84 may include an accelerometer, touch sensor, proximity sensor, light sensor, or the like. The user interface 72 may receive an input from a user which may then be provided to the processor 70 for interpretation of the input. The communication interface 74 may provide a communication gateway with a device, such as the mobile terminal 10 of FIG. 1 and may be connected with a wire or wirelessly to such a device. The communications interface 72 may include a transmitter, receiver, and antenna and may be configured to communicate via any of the aforementioned near-field or far-field communication protocols; however, near-field communications protocols such as Bluetooth™ may be preferred. The processor 70 may provide instructions for a display manager 82 which may, in turn, control the image or images presented on the display(s) 90 which may, in the case of augmented reality glasses, include a left lens display 86 and a right lens display 88. The images presented on the left lens display 86 and right lens display 88 may be independent and/or they may be complementary, providing an image overlay or a virtual three-dimensional representation of an object as will be described further below.

Figure 2:
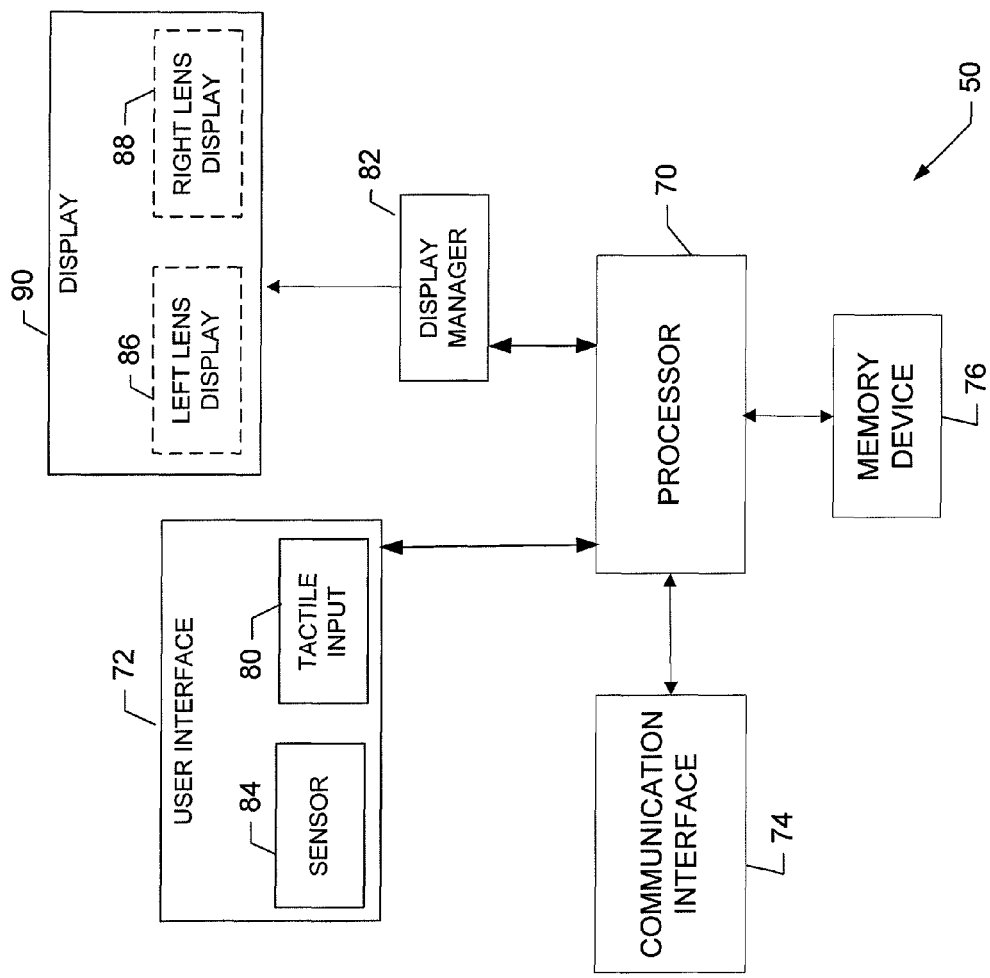
FIG. 2 is a schematic block diagram of an apparatus for receiving user input according to an example embodiment of the present invention.

It should also be noted that while FIG. 2 illustrates one example of a configuration of an apparatus for providing a mechanism by which input may be provided through an apparatus configured to provide for display of an image, such as augmented reality glasses, numerous other configurations may also be used to implement embodiments of the present invention. As such, in some embodiments, although devices or elements are shown as being in communication with each other, hereinafter such devices or elements should be considered to be capable of being embodied within a same device or element and thus, devices or elements shown in communication should be understood to alternatively be portions of the same device or element. The apparatus illustrated in FIG. 2 may be further configured with some or all of the components described with respect to FIG. 1 such that a mobile terminal may be fully embodied by the apparatus. As an example, augmented reality glasses may be configured with some or all of the functionality of a mobile terminal thereby not requiring a controlling device or separate device to control the functionality of the augmented reality glasses.

Referring again to FIG. 2, the apparatus 50 for providing a mechanism by which input may be provided through an apparatus configured to provide for display of an image is provided and may include or otherwise be in communication with a processor 70, a user interface 72, a communication interface 74 and a memory device 76. In some embodiments, the processor 70 (and/or co-processors or any other processing circuitry assisting or otherwise associated with the processor 70) may be in communication with the memory device 76 via a bus for passing information among components of the apparatus 50. The memory device 76 may include, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with an example embodiment of the present invention. For example, the memory device 76 could be configured to buffer input data for processing by the processor 70. Additionally or alternatively, the memory device 76 could be configured to store instructions for execution by the processor 70.

The apparatus 50 may, in some embodiments, be a device capable of presenting an image on a display such as augmented reality glasses or a display device configured to employ an example embodiment of the present invention. However, in some embodiments, the apparatus 50 or at least a portion thereof including the processor 70 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may include one or more processing cores configured to perform independently. A multi-core processor may enable multiprocessing within a single physical package. Additionally or alternatively, the processor 70 may include one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., an apparatus configured to provide for display of an image, such as augmented reality glasses or a display device) adapted for employing an embodiment of the present invention by further configuration of the processor 70 by instructions for performing the algorithms and/or operations described herein. The processor 70 may include, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device (such as mobile terminal 10) or module in communication with the apparatus 50. In this regard, the communication interface 74 may include, for example, an antenna (or multiple antennas) and supporting hardware and/or software for enabling communications with a wireless communication network. In some environments, the communication interface 74 may alternatively or also support wired communication. As such, for example, the communication interface 74 may include a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may include, for example, a sensor, button, touch areas, device surfaces capable of detecting objects hovering over the surface, soft keys, a microphone, a speaker, motion sensor, temperature sensor, accelerometer, or other input/output mechanisms. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the apparatus 50 may include or otherwise be in communication with a display 90. In different example cases, the display 90 may be a two dimensional (2D) or three dimensional (3D) display and may include multiple display surfaces, such as a left lens display 86 and right lens display 88. The user interface 72 may be in communication with the display 90 to receive indications of user inputs and to modify a response to such inputs based on corresponding user actions that may be inferred or otherwise determined responsive to the indications. In one alternative, an input may be provided other than by direct interaction with a tactile input (e.g., tactile input 80), such as a movement of the entire or part of the apparatus 50 which may be interpreted by a sensor 84, such as an accelerometer.

The user interface 72 may include sensor 84 and may be configured to receive an indication of an input in the form of a motion event of the apparatus 50 by detecting a motion event at sensor 84, which may be an accelerometer, gyrometer, or other motion detecting sensor for example. As such, the user interface 72 may be in communication with the processor 70 to receive indications of user inputs at the user interface 72 and to transmit the input received to the processor 70. Following recognition of a motion event, the user interface 72, in cooperation with the processor 70, and possibly memory device 76, may be configured to determine a pattern of the motion event and provide a corresponding operation or response based on the motion event pattern.

The motion sensor 84 may be in communication with a user device (such as mobile terminal 10) to receive indications of user inputs in the form of motion (e.g., movement of the device) in order to recognize and/or determine a motion event based on each input received at the motion sensor 84. A motion event may be defined as an acceleration or movement in a particular direction or pattern with a particular speed or device orientation. In this regard, for example, a motion event could be a tap of the apparatus 50 containing the motion sensor 84. The motion sensor 84 may be calibrated or configured to detect acceleration over a particular threshold such that inadvertent movement of the motion sensor 84 does not cause a motion event. For example, in some cases, the user interface 72 may be configured to detect a tap motion that includes a force and frequency. The force may be determined, for example by the rate of acceleration and the frequency may be determined by the transitions between negative acceleration and positive acceleration or changes in the direction of the acceleration. Subsequent to each motion event, the motion sensor 84 may be further configured to pass along data corresponding to the motion event (e.g., magnitude of acceleration along each of three primary, mutually orthogonal axes, force, number or frequency of movements, etc.) to the processor 70. The motion event characteristics or magnitudes may define a motion event pattern. Each motion event pattern may correspond to an operation for the device. For example, a tap that causes an acceleration in a first direction may be associated with a tap on a first side of the apparatus 50, such as the right temple 130 of augmented reality glasses 100, while an acceleration in a second direction may be associated with a tap on a second side of the apparatus 50, such as the left temple 140 of the augmented reality glasses 100. Thus, embodiments of the present invention may be able to differentiate between a tap on a first side versus a tap on a second side of the apparatus.

While sensor 84 is described herein as a motion sensor, accelerometer, or gyrometer, other embodiments of the present invention may include capacitive touch sensors, resistive touch sensors, toggle buttons, or the like. Such sensors may also be used to detect touches, taps, and other motion events as described herein.

Figure 3:
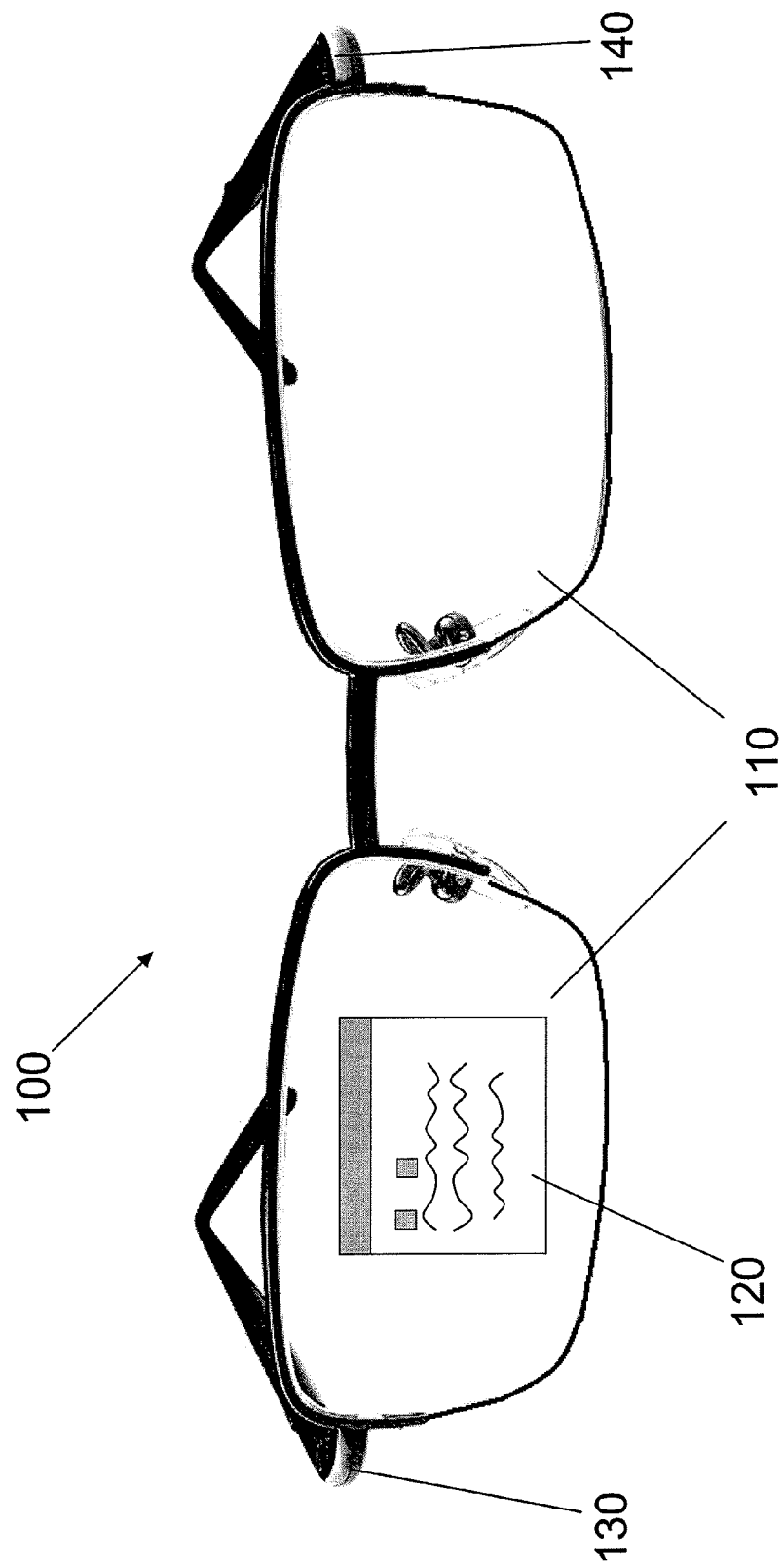
FIG. 3 is an illustration of augmented reality glasses according to an example embodiment of the present invention.

As such, example embodiments may provide for an apparatus (e.g., the processor 70 or a chip set including the processor 70) for providing input through a device comprising a display, such as augmented reality glasses 100 as shown in FIG. 3. Augmented reality glasses 100 may provide a visual overlay of an image 120 (e.g., visual elements or textual information) on a substantially transparent display surface, such as through lenses 110 that appear to be normal optical glass lenses. This visual overlay 120 allows a user to view objects and people in their typical, un-obscured field of view while providing additional information or images that may be displayed on the lenses 110. The visual overlay 120 may be displayed on one or both of the lenses 110 of the glasses 100 dependent upon user preferences and the type of information being presented. The visual overlay of the image 120 may be of various opacity ranging from transparent (or 0% opacity) to opaque (or 100% opacity). For example, a user may elect that information, such as a visual notification of an incoming phone call on a mobile terminal be displayed only on one lens 110. The lens chosen by the user may also be user selectable such that the lens selected is, or possibly is not, the dominant eye of the user as determined by the user preference. The image 120 presented on the lenses 110 of augmented reality glasses 100 may, in some cases, fully occlude the wearer's vision beyond the lens by presenting a substantially opaque image 120 on a substantially transparent display (e.g., the lens 110). Other example embodiments of a substantially transparent display may include a helmet visor or a windshield capable of presenting an image to a user. In such cases, the image 120 may be substantially opaque, which may allow a wearer to better see the image 120. In other cases, the image 120 may be partially transparent such that the wearer is able to see the environment beyond the lenses 110. The degree of transparency may be variable from fully transparent, where the image 120 is not shown, to fully opaque or non-transparent, or any degree therebetween. It is to be appreciated that while substantially transparent displays such as the lenses 110 of augmented reality glasses 100 may not achieve 100% opacity or become fully opaque, full opacity and the term opaque is used herein to describe the maximum degree of opacity which such displays may achieve. Therefore, 100% opacity may not fully occlude light from penetrating the displayed image.

Example embodiments may also present images that are arranged at the edges of the lens 110 or that include a central area of the lens which is substantially transparent while presenting a less transparent and possibly opaque image or series of images around the substantially transparent area. Such an embodiment may allow a wearer to view their environment while also providing images for the user to view.

Augmented reality coupled with object recognition allows for dynamic interactive information to be displayed on the lenses of the augmented reality glasses 100. Augmented reality glasses also allow for the display of two-dimensional (2-D) and three-dimensional (3-D) visual elements. Two-dimensional graphical elements rendered in the plane of the lens 110 can display user interface, status elements, or other images as would be viewed on a typical computer screen or display of a mobile terminal (e.g., display 28 of mobile terminal 10). These 2-D elements can communicate messages, alert the user with a notification, render an application that is currently in use, etc. Further 2-D elements may provide information regarding an object that a user of the augmented reality glasses is viewing through the glasses, such as by identifying a point-of-interest or landmark that a user is viewing. Such identification may be accomplished by various means including object recognition software or object recognition in conjunction with location identification (e.g. via Global Positioning System (GPS) signals) of the glasses 100 or the device to which they are in communication, such as mobile terminal 10. Three-dimensional elements can be rendered on top of the environment and seen through the glasses to identify objects, provide navigation, etc. As graphical elements rendered on the lenses 110 of the augmented reality glasses 100 may visually occlude the physical environment, it may be desirable to activate and deactivate the augmented reality interface of the glasses as quickly as possible.

Embodiments of the present invention may provide a mechanism by which augmented reality glasses 100 may receive input and use the input for control of the image overlay 120 presented on the glasses 100. As noted above with regard to FIG. 2, the augmented reality (AR) glasses may include a sensor 84 for detecting a user input. The input may be in the form of a motion event, such as a tap or multiple taps on a portion of the apparatus. The motion event may include motion of the apparatus. Furthermore, the apparatus may be configured to differentiate between the motions of a user (e.g., in the case of augmented reality glasses, motions such as nodding or other head movement) and the motions of the apparatus relative to the user. The user interface 72 or the processor 70 may interpret the properties of the motion event (e.g., the magnitude of acceleration along various axes) and determine a motion event pattern. The processor 70 may, in turn, control the operation of a device in accordance with the motion event pattern based upon the status of the device to which the glasses 100 are in communication (e.g., mobile terminal 10). The motion event pattern may correspond to a different operation of the device dependent upon the application running or a status or context of the device, such as if a voice call is ongoing or if a music player is playing. For example, if the device has notifications available for the user (e.g., new, unread email or messages, a missed phone call, etc.) a motion event pattern, such as a light tap on a temple 130 of the glasses 100 may cause the notifications to be displayed on the lens or lenses 110 of the glasses 100.

An example technique for implementing embodiments of the present invention may include a device, such as mobile terminal 10 that sends a request at a pre-defined frequency to the apparatus to determine if a motion event has occurred. The request may be sent to the sensor 84, or the request may be sent to the apparatus 50 which may, in turn, poll the sensor 84. After the apparatus 50 has received a motion event, for example in the form of a tap, the apparatus may respond to the request with properties of the motion event obtained from the sensor during the motion event. The properties obtained during the motion event may include the magnitude of the motion detected by the sensor 84, for example, in the form of three magnitude values corresponding to the three principle axes, X, Y, and Z. The magnitudes registered by the sensor 84 may be the acceleration experienced by the sensor 84. Magnitudes below a threshold value may be ignored by the sensor 84, or by the apparatus 50 to avoid unintentional motion events. The threshold may be pre-set or may be user defined to allow a user to vary the sensitivity of the apparatus 50. The requests may be sent from the device, such as mobile terminal 10 to the apparatus 50; however, in other embodiments, the requests may be from the processor 70 of the apparatus 50 to the sensor 84 of the user interface 72.

The magnitudes of each directional component of the motion event may combine to correspond to a motion event pattern. The motion event pattern may include a first magnitude for the X-axis, a second magnitude for the Y-axis, and a third magnitude for the Z-axis. The motion event pattern may be complex, including a magnitude component from each of the three axes; however, simpler motion event patterns may also be possible where the values from only one or two of the axes are considered part of the motion event pattern while the other axis may be ignored. The simpler motion event patterns may reduce the potential number of recognizable motion event patterns; however, because there are fewer possible patterns, the detection of the motion event patterns may be more accurate and repeatable. The motion event patterns may be determined by a processor at the mobile terminal 10 or the motion event pattern may be determined by the processor 70 of the apparatus 50. The operations corresponding to the various motion event patterns for an apparatus in a certain context or operational state may be stored in a memory (subject to user modification) and accessible to the processor to effect the operations.

The motion event pattern determined in response to receiving a motion event may correspond to an operation of the apparatus 50 or the mobile terminal 10. For example, a motion event pattern may turn on, or activate the apparatus 50 (e.g., augmented reality glasses 100 of FIG. 3) if the apparatus 50 was previously active. The same motion event pattern may be used to turn off, or deactivate the apparatus 50 if the apparatus is already active. Other motion event patterns may correspond to different operations which may be user configurable. For example, a tap on a right temple 130 of augmented reality glasses 100 may produce a motion event with a motion event pattern corresponding to a first operation which causes the glasses 100 to turn on and display relevant information, such as new notifications from a mobile terminal 10. Similar motions by a user may effect different operations. For example, if the tap on the right temple 130 produces a low-magnitude motion event, the motion event pattern may correspond to an operation that slowly turns on the display or animates the display into the field of view of a wearer, such as by fading in or sliding in from a side of the glasses. A firmer tap of the right temple may produce a larger-magnitude motion event which may correspond to a motion event pattern that causes the display to turn on instantly without delay or animation effects. A tap of the left temple 140 of the glasses 100 may cause the glasses 100 to turn off or deactivate. Again, a light tap may cause the display to fade or be animated out of view while a firm tap may cause an instant removal of the display. Each motion event pattern may be mapped to a different operation in a map maintained by the apparatus 50 or the mobile terminal 10. The map may be stored, for example, in memory device 76 or memory 42.

Different motion event patterns may correspond to different operations as outlined above. Each of these operations may be user configurable or they may be pre-defined by an apparatus or device manufacturer. Further, the motion event patterns may correspond to different operations in dependence of the operational state or context of a device such as a mobile terminal. For example, when a music player application is playing a music track on a mobile terminal, a tap of the temple of the glasses may cause the artist, track title, album cover art, or any number of details regarding the music track to be displayed on the augmented reality glasses lenses. When a phone call is being received at the mobile terminal, a tap of the temple of the glasses may cause details of the identity of the caller to be displayed while a second tap of the temple of the glasses may cause the call to be answered. A tap to the opposite temple may cause the call to be ignored. As evidenced, the operations that may be effected by motion event patterns received by apparatuses according to example embodiments of the present invention may correspond to any available operations of a mobile terminal or an apparatus configured to provide for display of an image, such as augmented reality glasses. Thus, each operational state of a device such as a mobile terminal may have a different map such that the same motion event patterns may be mapped to different operations in dependence on the operational state of the device.

Embodiments of the present invention may include additional functionality by recognizing motion event patterns that include multiple motion events, such as multiple taps being considered as a single motion event pattern. The sensor 84, upon detecting a first motion event, or the processor upon receiving an indication from the sensor of a first motion event, may initiate a period of time after the first motion event in which a second or further motion event may occur. In such an embodiment, if an additional motion event occurs in the predetermined time period after the first motion event, it may be considered part of the same motion event pattern. Multiple motion events as part of a single motion event pattern may provide additional operations to be effected by an apparatus according to an embodiment the present invention. For example a motion event pattern of one tap may turn on a device while a motion event pattern of two taps may turn the device off.

As outlined above with respect to the augmented reality glasses, the input to the glasses 100 may be both subtle and convenient for a user, particularly when the user needs to be discreet (e.g., when the user is in a meeting or at a social event) or when accessibility to a mobile terminal or other device is not convenient due to the device being in a purse, pocket, or is otherwise not readily accessible.

As described above, the images 120 presented on the lenses 110 of augmented reality glasses 100 may visually occlude a wearer's environment. The method of input including the detection of a motion event pattern may provide a simple and relatively quick mechanism by which a user may transition between an opaque image which occludes a wearer's vision and a transparent image (or lack of an image) to provide the wearer with a clear view of their environment. Augmented reality glasses 100 may be worn whether or not they are presenting an image to a wearer. The glasses may be worn as a fashion accessory or may be worn for the convenience of having their functionality readily accessible. As taking-off and putting-on glasses can be inconvenient and may require placing the glasses in a suitable storage location or removing them therefrom, it may be undesirable for a wearer to remove their augmented reality glasses between uses of the image display capability. Further, a wearer may require the image display capability to be quickly and easily turned on and off.

An example embodiment of the present invention will be described herein with reference to FIG. 3. The example embodiment may include augmented reality glasses 100 that are configured to present an image 120 to a wearer in response to a tap on the right temple 130 of the glasses. The image may quickly appear in a substantially opaque presentation, occluding the wearer's view of their environment. Optionally, a tap of the right temple may be configured to increase the opacity of the image beginning with a fully transparent lens in which the image 120 is not present. One tap of the right temple 130 may display an image with an opacity of 25%. A second tap may increase the opacity to 50%. A third tap may increase the opacity further to 75% while a fourth tap may increase the opacity to 100%. Opacity may be measured, for example, by the amount of light that is allowed through. An image with 50% opacity may allow 50% of the light through as compared to full transparency or 0% opaque. Conversely, a tap on the left temple 140 may be configured to reduce the opacity of an image 120. For example, one tap may reduce the opacity by 25%. Optionally, as it may be important for a user to quickly remove an image from their view, a tap of the left temple 140 may immediately reduce the opacity to 0%. It may be important for a wearer to quickly remove an image from the lens 110 of augmented reality glasses 100 as the wearer may be performing a task or confronted with something that requires their immediate attention. Thus, a single tap of the augmented reality glasses 100 may quickly and easily restore the wearer's view of their environment.

While the aforementioned example embodiment comprises varying the opacity of an image, other example embodiments that may be used exclusive of, or in conjunction with variable opacity may include movement of an image on the display into and out-of the view of a wearer or user. For example, in the embodiment of augmented reality glasses 100, a tap on the right temple 130 of the glasses may cause an image to slide-in or pan-in from the right side of the lens 110 or display. A tap on the left temple 140 may cause the image to slide-out or pan-away towards the right side of the lens 110, removing the image from view. Further, a tap on a temple or other location on the glasses 100 may cause the image to flip, or change to a next image, such as when viewing multiple pages in a text document or scrolling between active applications. Further embodiments may include movement of an image from directly in front of a wearer's vision (e.g., the center of the lens 110) to an edge of the lens 110 in response to a motion event pattern received by the device. Such an embodiment may allow the image to remain viewable by the wearer while providing the wearer improved vision of their environment.

In example embodiments, such as those outlined above, the motion event pattern may cause an image to create an occlusive effect on a display (e.g., the image may occlude or block a wearer's view when displayed). The degree to which the occlusive effect may occlude a wearer's view may be dependent upon the opacity of an image or the location of an image. For example, animating an image into the middle of a lens 110 by sliding the image in from an edge of the lens provides an occlusive effect whereby the wearer's vision becomes occluded by the image 120. The removal of an image from the lens 110 in response to a motion event pattern effects another occlusive effect whereby the occlusion is removed. Thus, the occlusive effect may comprise bringing an image into a wearer or users view or removing an image from the wearer or users view as well as varying opacity of the image. Further, the occlusive effect may involve any known manner of increasing or decreasing the visibility of an image on a display of example embodiments. For example, the visibility of an image may be changed by altering the contrast of an image, altering the brightness of an image, changing the color of an image, changing the pixel count or density of an image, enhancing the visual saliency of an image, changing the position of the image, etc. The occlusive effect may include some or all of the above mechanisms by which an image may be presented to a user.

Figure 4:
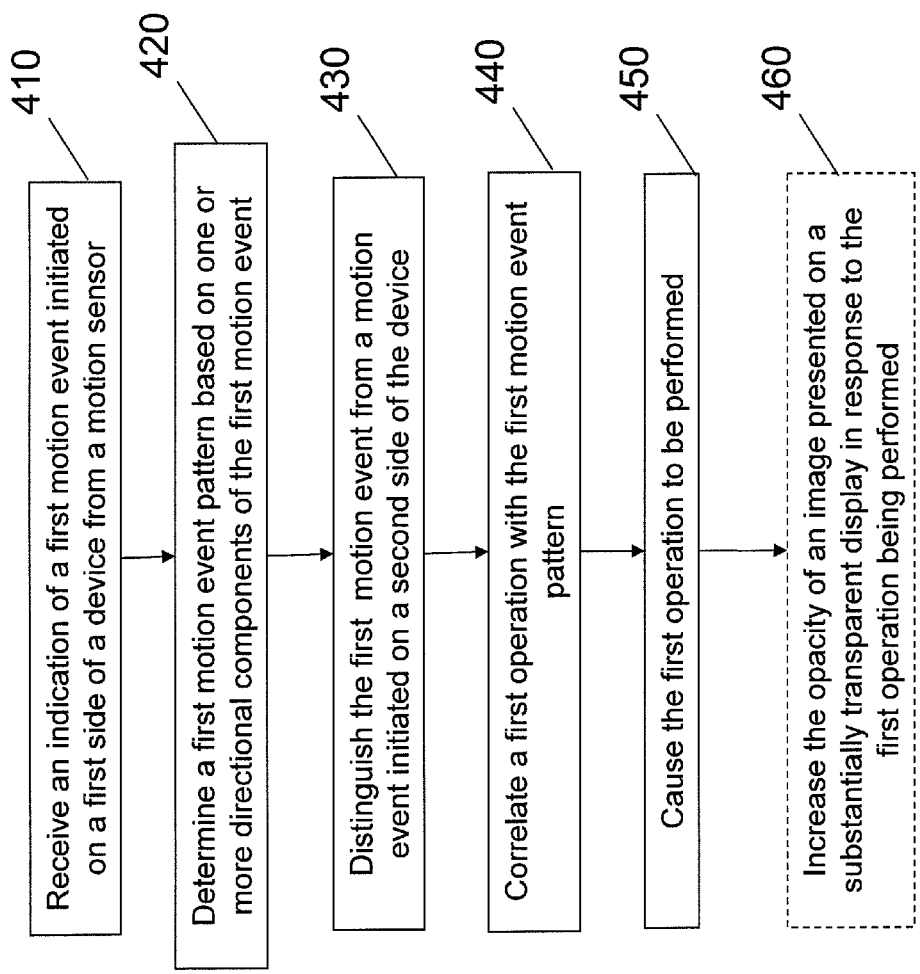
FIG. 4 is a block diagram according to an example method for providing a mechanism by which a user may provide input to an apparatus according to an example embodiment of the present invention.
Figure 5:
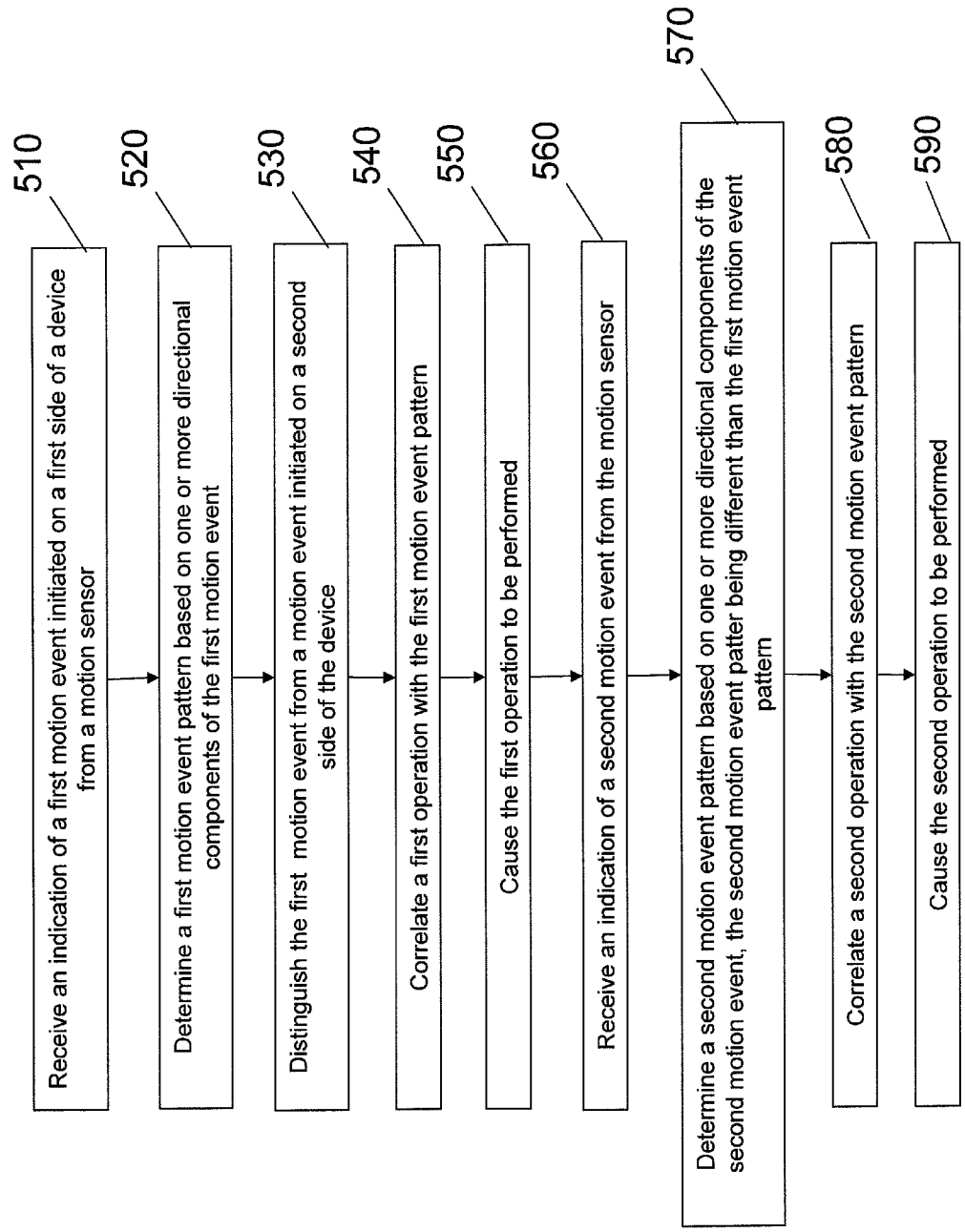
FIG. 5 is a block diagram according to an example method for providing a mechanism by which a user may provide input to an apparatus according to another example embodiment of the present invention.

FIGS. 4 and 5 are flowcharts of techniques according to example embodiments of the invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device (e.g., memory 42) of a user device such as mobile terminal 10 and executed by a processor 20 in the user device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In this regard, a method according to one embodiment of the invention, as shown in FIG. 4, may include receiving an indication of a first motion event initiated on a first side of a device from a motion sensor at 410. A first motion event pattern based on one or more directional components of the first motion event may be determined at 420. The method may also include distinguishing the first motion event from a motion event initiated on a second side of the device at 430. The first motion event pattern may be correlated with a first operation at 440 and the first operation may be caused to be performed at 450. Optionally, as shown in dashed lines in FIG. 4, the first operation may cause the opacity of an image presented on a substantially transparent display to be increased at 460.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein. In some embodiments, the directional components may include three principle axes of motion, with each axis being orthogonal to the other two axes. As illustrated in the flowchart of FIG. 5 which illustrates operations of FIG. 4 in operations 510-550, some embodiments may further include receiving an indication of a second motion event at the motion sensor at 560, determining a second motion event pattern based on one or more directional components of the second motion event, where the second motion event pattern is different than the first motion event pattern at 570, correlating a second operation with the second motion event pattern at 580, where the second operation is different than the previous operation, and causing the second operation to be performed at 590. In some embodiments, a request may be sent to the motion sensor. Correlating an operation with the motion event pattern may include correlating the motion event pattern with an operation obtained from a map of operations, where the map of operations may include a plurality of operations, each associated with a different motion event pattern. In some embodiments, two motion events or more occurring within a predefined time period may be considered part of a single motion event pattern. An example of multiple motion events comprising a single motion event pattern may include a double-tap or triple-tap where the taps occur within a one second window, similar to a double-click event of a computer mouse. Optionally, correlating an operation with the motion event pattern may include correlating an operation with the motion event pattern and an operational state of a device.

In an example embodiment, an apparatus for performing the method of FIG. 4 or 5 above may comprise a processor (e.g., the processor 70) configured to perform some or each of the operations (410-460 and/or 510-590) described above. The processor 70 may, for example, be configured to perform the operations (410-460 and/or 510-590) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 410-460 and/or 510-590 may comprise, for example, the user interface 72 (or respective different components thereof). Additionally or alternatively, at least by virtue of the fact that the processor 70 may be configured to control or even be embodied as the user interface 72, the processor 70 and/or a device or circuitry for executing instructions or executing an algorithm for processing information as described above may also form example means for performing operations 410-460 and/or 510-590.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   receiving an indication of a first motion event initiated on a first side of a device from a motion sensor;
   determining a first motion event pattern based on one or more directional components of the first motion event;
   distinguishing the first motion event from a motion event initiated on a second side of the device;
   correlating a first operation with the first motion event pattern, wherein correlating the first operation with the first motion event pattern comprises correlating the first motion event pattern with an operation obtained from a map of operations that associates operations with motion event patterns; and
   causing the first operation to be performed.

2. The method of claim 1, wherein the first operation comprises causing the opacity of an image presented on a substantially transparent display to be increased.

3. The method of claim 1, further comprising:
   receiving an indication of a second motion event from the motion sensor;
   determining a second motion event pattern based on one or more directional components of the second motion event, wherein the second motion event pattern is different than the first motion event pattern;
   correlating a second operation with the second motion event pattern, wherein the second operation is different than the first operation; and
   causing the second operation to be performed.

4. The method of claim 1, wherein the first operation relates to an occlusive effect of an image on a display.

5. The method of claim 1, wherein the first motion event pattern comprises a plurality of motion events.

6. The method of claim 1, wherein correlating the first operation with the first motion event pattern comprises correlating the first motion event pattern with an operational state of a device.

7. The method of claim 1, wherein the first operation comprises answering a call.

8. An apparatus comprising at least one processor and at least one memory including computer program code, the at least one memory and the computer program code configured to, with the processor, cause the apparatus to at least:
   receive an indication of a first motion event initiated on a first side of a device from a motion sensor;
   determine a first motion event pattern based on one or more directional components of the first motion event;
   distinguish the first motion event from a motion event initiated on a second side of the device;
   correlate a first operation with the first motion event pattern, wherein causing the apparatus to correlate the first operation with the first motion event pattern comprises causing the apparatus to correlate the first motion event pattern with an operation obtained from a map of operations, that associates operations with motion event patterns; and
   cause the first operation to be performed.

9. The apparatus of claim 8, wherein the first operation comprises causing the opacity of an image presented on a substantially transparent display to be increased.

10. The apparatus of claim 8, further configured to:
    receive an indication of a second motion event at the motion sensor;
    determine a second motion event pattern based on one or more directional components of the second motion event, wherein the second motion event pattern is different than the first motion event pattern;
    correlate a second operation with the second motion event pattern, wherein the second operation is different than the first operation; and
    cause the second operation to be performed.

11. The apparatus of claim 8, wherein the first operation relates to an occlusive effect of an image on a display.

12. The apparatus of claim 8, wherein the first motion event pattern comprises a plurality of motion events.

13. The apparatus of claim 8, wherein causing the apparatus to correlate the first operation with the first motion event pattern comprises causing the apparatus to correlate the first motion event pattern with an operational state of the apparatus.

14. The apparatus of claim 8, wherein the first operation comprises answering a call.

15. A computer program product comprising at least one non-transitory computer-readable storage medium having computer-executable program code instructions stored therein, that when executed by a processor perform:
    receiving an indication of a first motion event initiated on a first side of a device from a motion sensor;

determining a first motion event pattern based on one or more directional components of the first motion event;

distinguishing between the first motion event from a motion event initiated on a second side of the device;

correlating a first operation with the first motion event pattern, wherein correlating the first operation with the first motion event pattern comprises correlating the first motion event pattern with an operation obtained from a map of operations that associates operations with motion event patterns; and causing the first operation to be performed.

16. The computer program product of claim 15, wherein the first operation comprises causing the opacity of an image presented on a substantially transparent display to be increased.

17. The computer program product of claim 15, further comprising program code instructions to:

receive an indication of a second motion event at the motion sensor;

determine a second motion event pattern based on one or more directional components of the second motion event, wherein the second motion event pattern is different than the first motion event pattern;

correlate a second operation with the second motion event pattern, wherein the second operation is different than the first operation; and cause the second operation to be performed.

18. The computer program product of claim 15, wherein the first operation relates to an occlusive effect of an image on a display.

19. The computer program product of claim 15, wherein the first motion event pattern comprises a plurality of motion events.

20. The computer program product of claim 15, wherein the first operation comprises answering a call.

* * * * *